Dec. 29, 1964   L. T. ROSENBERG   3,163,789
THERMALLY BALANCED ROTOR
Filed Nov. 2, 1962   2 Sheets-Sheet 1

Inventor
Leon T. Rosenberg
By Robert B. Benson
Attorney

United States Patent Office 3,163,789
Patented Dec. 29, 1964

3,163,789
THERMALLY BALANCED ROTOR
Leon T. Rosenberg, Wauwatosa, Wis., assignor to Allis-Chalmers Manufacturing Company, Milwaukee, Wis.
Filed Nov. 2, 1962, Ser. No. 234,979
8 Claims. (Cl. 310—53)

This invention relates generally to the balancing of rotors of large dynamoelectric machines. More specifically this invention relates to the thermal balancing of conductor cooled rotors of dynamoelectric machines, that is rotors whose windings are cooled by a flow of gas such as hydrogen through or in direct contact with the rotor conductors.

In large generators, experience has shown that some rotors that were in good mechanical balance when cold, exhibited abnormal vibration at operating temperature. The most common cause of this behavior termed "thermal unbalance" is unequal temperature around the rotor periphery which causes the shaft to bow. In mild cases of thermal unbalance it is usually possible to rebalance mechanically for some intermediate load and temperature, and thus obtain a satisfactory mechanical balance over the full operating temperature range. In more severe cases, mechanical balancing alone sometimes proves inadequate.

In the past, most cases of thermal balancing of cylindrical rotors were accomplished by throttling the flow of gas in certain of the normal cooling ducts. When properly applied, this method was highly successful but because the cooling medium had to be throttled it could only be employed on rotors having adequate temperature rise margin. Moreover, in rotors cooled by direct contact of the cooling medium with the conductors, selective throttling of the gas flow required the removal of the rotor from the stator, a very costly and time consuming operation, for each thermal balance trial. Since two or more trials would usually be expected to obtain a satisfactory thermal balance, this method was considered prohibitive.

The thermal balancing system of this invention overcomes the objections described above by providing thermal balancing ducts for carrying extra cooling fluid through portions of the rotor poles that normally do not need this additional cooling, and means for controlling the rate of flow through these cooling ducts without removing the rotor from the stator. This allows the balancer to compensate for unequal heat transfer in the different portions of the rotor and thus to obtain a good balance at all temperatures without detracting appreciably from the normal required cooling fluid for the rotor windings. After having been mechanically balanced, in the usual manner, any rotor possessing the features of this invention that manifests thermal unbalance can be separately thermally balanced while remaining in the stator with the result that the best possible balance is readily obtained for all operating conditions of the generator.

Therefore, it is the object of this invention to provide a new and improved dynamoelectric machine.

Another object of this invention is to provide a generator having a new and improved rotor having a better balance.

Another object of this invention is to provide a gas cooled generator having means for selectively directing additional cooling fluid through ducts of the rotor for thermal balancing, without removal of the rotor from the stator.

Other objects and advantages of this invention will be apparent from the following description when read in connection with the accompanying drawings in which.

Figure 1:
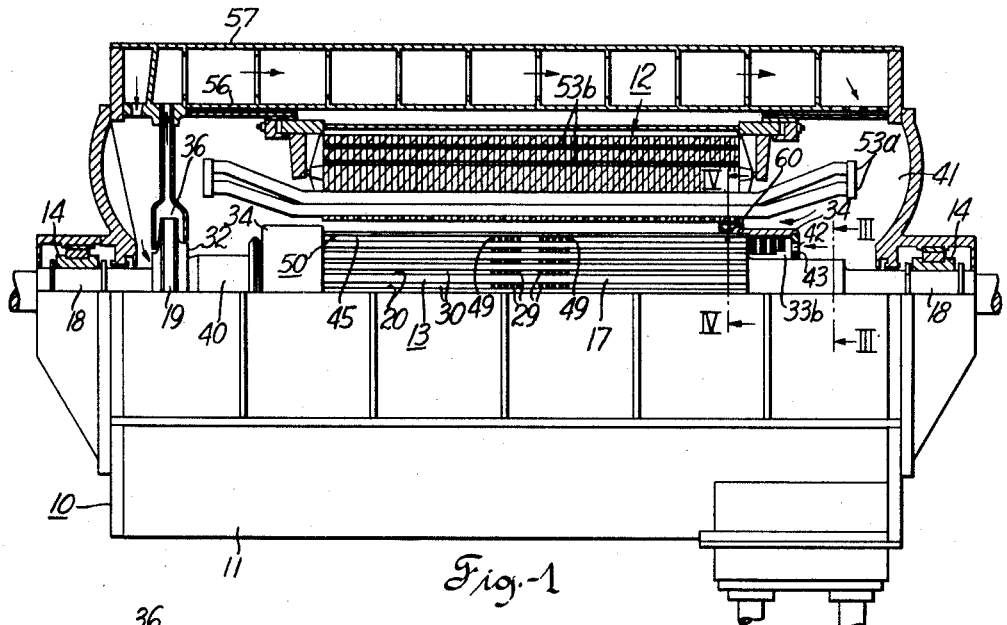
FIG. 1 is a side view partially in section of a large gas cooled turbogenerator incorporating the thermal balancing means of this invention.
Figure 2:
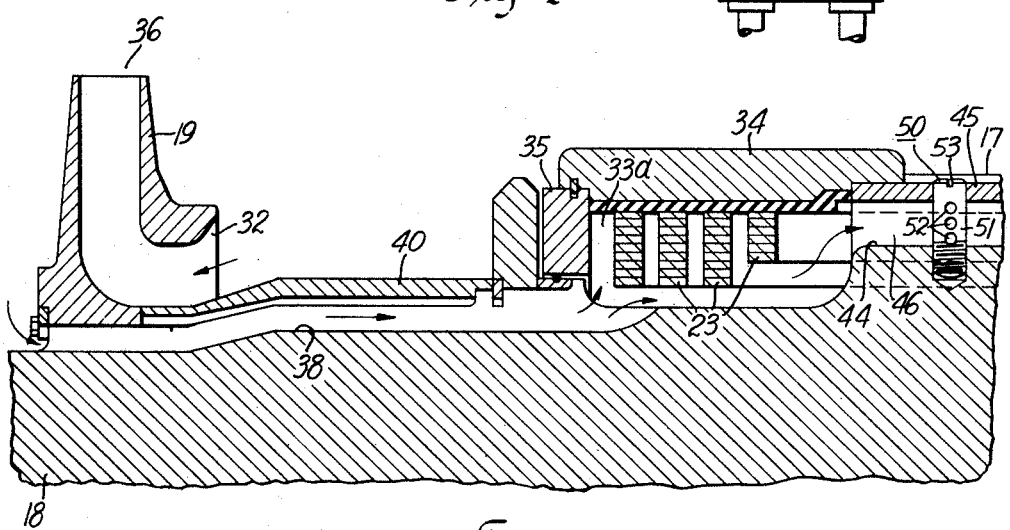
FIG. 2 is an enlarged cross section view of the rotor end portion illustrating the axial cooling ducts of the rotor and the thermal balancing means.

The thermal balancing means of this invention is illustrated in combination with a large hydrogen cooled two pole turbine generator although it could be used with any gas cooled dynamoelectric machine. As specifically shown in the drawing the generator 10 comprises an annular housing 11, a stator core and winding assembly 12 positioned within that housing and a rotor 13 mounted on bearings 14 and rotatably positioned within the bore of the stator. The rotor 13 comprises an enlarged core sections 17 formed integrally with the shaft. The shaft extensions 18 at either end are mounted in the bearings 14 and a blower 19 is mounted on one end of the shaft for forcing the cooling fluid in predetermined paths through the generator.

Figure 4:
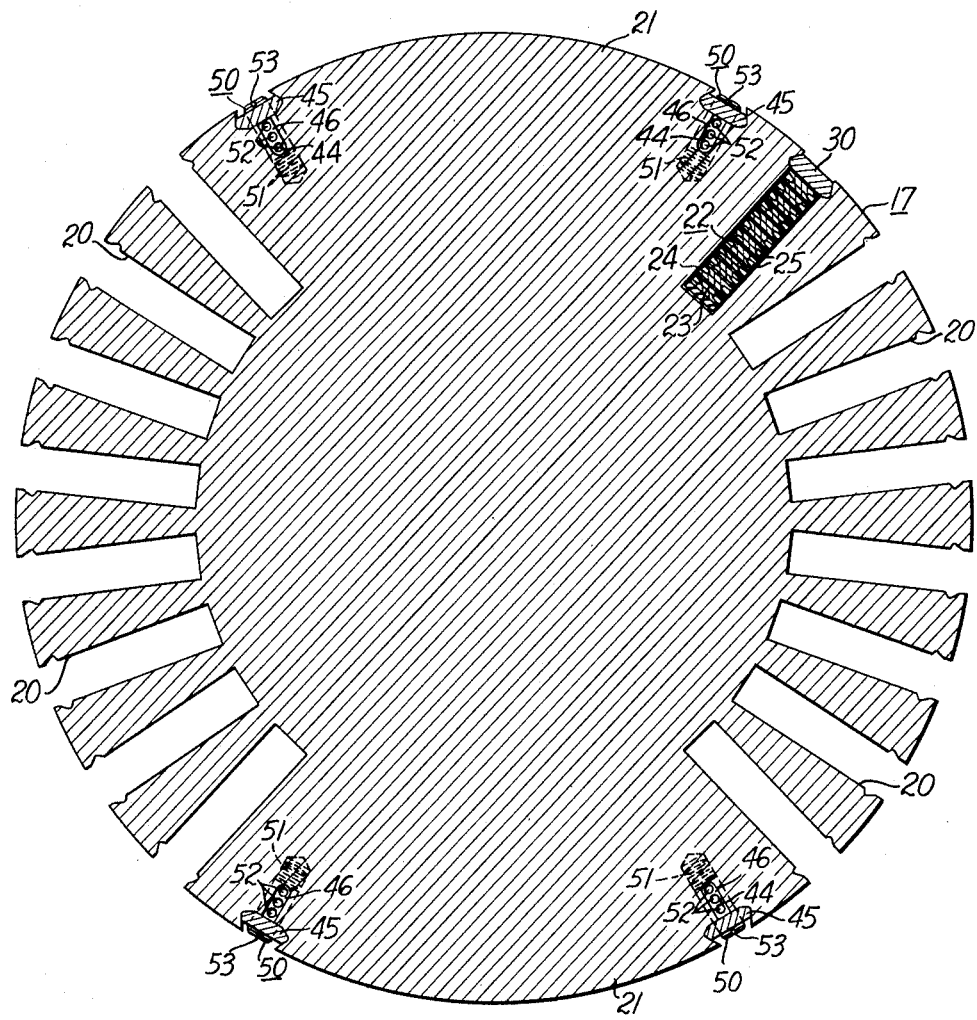
FIG. 4 is a cross section view taken along the line IV—IV of FIG. 1 showing the location of the winding slots and the thermal balancing slots in the rotor core.

The core section 17 of the rotor has a larger diameter than the shaft 18 and is provided with longitudinally extending winding slots 20 arcuately spaced around the periphery of the rotor between the poles 21. Suitable conductors 22 are positioned in these slots to form the winding 23 for the rotor. In FIG. 4 of the drawings, only one of the slots 20 is shown with conductors 22 but in the actual machine all slots 20 would have conductors therein. In the conductor cooled machine as illustrated, these conductors are formed of silver bearing, hard drawn strip copper 22 having concave beveled edges which combine in pairs with the sides of the slot insulating channels 24 to form longitudinally extending cooling ducts 25. The longitudinal ducts may also be provided entirely within each conductor, or they may be formed by grooves provided between the conductors. The copper conductors have openings suitably located along their length to form radial ducts which communicate with discharge openings 29 in the slot wedges 30 which are securely held in notches at the top of the conductor slots 20 to hold the windings in the slots against centrifugal force. Thus, the slot wedges also provide a means for conducting the cooling gas radially outward from the cooling ducts 25 to the air gap of the generator from where the cooling fluid returns to the inlet 32 of the blower 19.

The rotor conductors 23 have inlets at their ends for receiving cooling gas from the blower 19. These inlets are located in pressurized regions or chambers 33a and 33b at the ends of the rotor core 17. The chambers 33a and 33b are bounded by a coil retaining ring 34 that extends axially beyond the end of the core section 17, an annular disk 35 that abuts the free end of the ring 34 and extends radially inward to the shaft extension 18, the shaft extension itself and the end of the rotor core section. At the blower end, chamber 33a is connected to the discharge side 36 of the blower 19 through the heat exchangers in the housing 11, and slots 38 in the shaft extension 18 which extend under the hub of the impeller of the blower 19. The portion of the shaft 18 between the hub of the blower and the annular disk 35 is covered by a sleeve 40 to prevent the escape of any of the high pressure gas into the inlet 32 of the blower.

Figure 3:
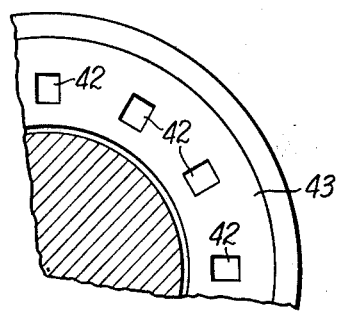
FIG. 3 is a cross section view taken along the line III—III of FIG. 1.

A similar pressurized chamber 33b may be formed at the end of the rotor removed from the blower. The pressurized gas enters this chamber 33b from the large pressurized cold gas chamber 41 in the housing 11, through openings 42 in the annular disk 43 as shown in FIG. 3. An annular baffle 60 is placed at the entrance of the air gap between the rotor 13 and stator 12 to restrict the escape of gas into the air gap and thereby insure maintaining adequate ventilating pressure to provide the required flow of gas into the chamber 33b as well as into the cooling ducts 53a and 53b in the stator windings and core respectively.

A pair of axially extending grooves or slots 44 are formed in each pole portion 21 of the core. These slots are formed as close as practical to the winding slots 20. A suitable wedge 45 is positioned and secured in the top of each slot 44 to form with the sides and bottom of the slot a thermal balancing duct 46 and provide a relatively smooth cylindrical outer surface. The wedges 45 are also provided with radial discharge openings 49 suitably located along the rotor length for conducting the cooling fluid out of the duct into the air gap of the machine.

At each end of the core section 17, the thermal balance ducts 46 communicate with the pressurized coil end chambers 33a and 33b from which the cooling medium flows into the rotor cooling ducts 25 adjacent the windings. To prevent the escape of the cooling medium into the thermal balance ducts 46, suitable valves 50 are positioned at the ends of the thermal balancing ducts 46 adjacent the pressurized chambers. These valves 50 are normally closed, but when thermal balancing is desired they are used to control the amount of cooling gas flowing into the longitudinally extending thermal balancing ducts 46. As shown in the drawing, the valves are positioned at the extreme ends of the core portion so as to be easily accessible for adjustment without removing the rotor from the stator.

As illustrated in the drawings, the valves 50 are preferably studs 51 provided with openings 52. The studs 51 extend through the wedges and the full depth of the thermal slots 44 and threadedly engage the core 17. The diameter of the studs 51 exceed the width of the groove sufficiently so that it engages the sides of the slots 44 and can thereby completely obstruct the flow of gas into the thermal balancing ducts 46, despite the holes 52 described below. The studs 51 have a series of parallel openings or holes 52 extending therethrough at the same height as the thermal balancing duct 46. When these holes 52 are transverse to the duct 46, their normal position, the stud completely obstructs the duct because of its larger diameter and no gas can pass into the core portion of the rotor in the ducts 46. On the other hand when the holes 52 are parallel to the duct 46, a full volume of gas flows through the studs 51 into the core portion in the duct. Naturally, the volume of gas flowing past the stud can be varied from zero to maximum by changing the angular position of the stud. This is done by merely rotating the stud 51. The screw driver slot 53 at the top of the stud provides a means for rotating the stud and serves to indicate the degree of valve opening. When the generator has been finally thermally balanced the metal surrounding the bolt is peened into the screw driver slot of the stud to fix its position relative to the thermal balance duct 46.

It is significant that none of the thermal balancing ducts are required for cooling of the generator. Any gas flowing in these ducts provides additional cooling and hence does not detract appreciably from the capacity of the generator as would be the case if necessary cooling gas were throttled, corresponding to prior art practice.

In operation, the generator 10 is filled with hydrogen within a gas tight housing 11. When the shaft is started up, hydrogen is brought into the inlet 32 of the blower 19 and forced radially outward through the heat exchangers which are mounted between the inner and outer casing 56, 57 of the housing. In traversing the heat exchangers, the hydrogen also flows axially through the housing to the far end of the generator then radially inward to the pressurized cold gas chamber 41. From here it divides and flows axially through the generator air gap, stator core and windings, and rotor winding via chamber 33b, to the inlet 32 of the blower. Another portion of the cooled hydrogen flows radially inward at the blower end of the housing, then axially through the slots 38 in the shaft extensions 18 into the chamber 33a and thence into the rotor windings at the blower end. The discharging hot gas from both ends of the rotor windings flows radially outward into the air gap of the generator and out through the air gap to the inlet 32 of the blower.

Should a rotor be found to exhibit thermal unbalance, i.e., to become unbalanced as its temperature changes, the vibration amplitude and phase angle changes are carefully determined. Then the machine is shut down and the valves 50 are adjusted as required with a suitable tool to admit cooling fluid into one or more of the thermal balancing ducts 46 so as to offset the thermal unbalance, insofar as can be predicted. This is done without removing the rotor from the generator.

The generator is then started again and checked for balance in both the cold and hot condition. If the balance is still not satisfactory at all loads, the amplitude and phase changes are again noted and the generator is again shut down. The appropriate valves are then readjusted making use of the response observed during the initial trial to obtain a more accurate estimate of the proper valve openings. The generator is then started again and the procedure repeated if necessary until a satisfactory balance is obtained over the entire operating range. The valves 50 are then locked in position by peening.

Although but one embodiment of this invention has been illustrated and described it will be apparent to those skilled in the art that various modifications and changes can be made herein without departing from the spirit of the invention or the scope of the appended claims.

Having now particularly described and ascertained the nature of my said invention and the manner in which it is to be performed, I declare that what I claim is:

1. A rotor for a gas cooled generator comprising: a shaft having an enlarged core section, said core section having arcuately spaced pole portions and longitudinally extending winding slots formed in the area between said poles, conductors positioned in said winding slots, cooling ducts formed in said core; longitudinally extending grooves formed in said pole portions of said core, cover means positioned in the top of said grooves to form thermal balancing ducts, means for forcing cooling gas into said cooling ducts and said balancing ducts, longitudinally spaced apertures in said cover means for discharging cooling fluid from said balancing ducts, and valve means mounted in said balancing ducts for controlling the amount of gas admitted into said balancing ducts.

2. A rotor for a gas cooled generator comprising: a shaft having an enlarged core section, said core section having arcuately spaced pole portions and longitudinally extending winding slots formed in the area between said poles, conductors positioned in said winding slots, cooling ducts formed in said winding slots; longitudinally extending grooves formed in said pole portions of said core, cover means positioned in the top of said grooves to form thermal balancing ducts, longitudinally spaced apertures in said cover means for discharging cooling fluid from said balancing ducts, blower means for forcing cooling gas into cooling ducts and said thermal balancing ducts, valve means mounted on at least one end of said rotor in said balancing ducts for controlling the amount of gas admitted into said balancing ducts.

3. A rotor for a gas cooled generator comprising: a shaft having an enlarged core section, said core section having arcuately spaced pole portions and longitudinally extending winding slots formed in the area between said poles, conductors positioned in said winding slots and being insulated from each other, channel members for insulating said conductors from the walls of said slots, said conductor strips having surfaces that combine with the sides of said insulating channels to form cooling ducts; longitudinally extending grooves formed in said pole portions of said core, cover means positioned in the top of said grooves to form thermal balancing ducts, longitudinally spaced apertures in said cover means for discharging cooling fluid from said balancing ducts, blower means for forcing cooling gas into said cooling ducts and said balancing ducts, valve means mounted on at least one end of said rotor in said balancing ducts for controlling the amount of gas admitted into said balancing ducts.

4. A rotor for a gas cooled generator comprising: a shaft having an enlarged core section; said core section having arcuately spaced pole portions and longitudinally extending winding slots formed in the area between said poles, electrical conductors positioned in said winding slots, cooling ducts formed in said winding slots; longitudinally extending grooves formed in said pole portions of said core near said winding slots, cover means positioned in the top of said grooves to form thermal balancing ducts; longitudinally spaced apertures in said cover means for discharging cooling fluid from said balancing ducts; a pressure chamber formed at at least one end of said core; the ends of said cooling and said balancing ducts opening into said pressure chamber, valves at the end of said balancing ducts adjacent said pressure chamber for varying the amount of gas admitted into said balancing ducts, blower means driven by said shaft for supplying high pressure cooling gas and means for conducting gas from the discharge side of said blower into said pressure chambers.

5. A rotor for a gas cooled generator comprising: a shaft having an enlarged core section; said core section having arcuately spaced pole portions and longitudinally extending winding slots formed in the area between said poles; electrical conductors positioned in said winding slots; cooling ducts formed in said winding slots; longitudinally extending grooves formed in said pole portions of said core near said winding slots; cover means positioned in the top of said grooves to form thermal balancing ducts; longitudinally spaced apertures in said cover means for discharging cooling fluid from said balancing ducts; retaining rings surrounding the ends of said core section and extending axially outward; annular disks abutting the free ends of said retaining rings and extending radially inward toward said shaft to form a pressure chamber at each end of said core between said shaft, said core, said annular disks and retaining rings; the ends of said cooling and said balancing ducts opening into said pressure chambers, valves at each end of said balancing ducts for varying the amount of gas admitted into said balancing ducts, blower means driven by said shaft for supplying high pressure cooling gas and means for conducting gas from the high pressure side of said blower into said pressure chambers.

6. A rotor for a gas cooled generator comprising: a shaft having an enlarged core section; said core section having arcuately spaced pole portions and longitudinally extending winding slots formed in the area between said poles; electrical conductors positioned in said winding slots cooling ducts formed in said winding slots; longitudinally extending grooves formed in said pole portions of said core near said winding slots; cover means positioned in the top of said grooves to form thermal balancing ducts; longitudinally spaced apertures in said cover means for conducting cooling fluid from said balancing ducts; a pressure chamber formed at at least one end of said core; the ends of said cooling and said balancing ducts opening into said pressure chamber, valves at the end of said balancing ducts adjacent said pressure chamber, said valves comprising a stud extending through said cover and said balancing duct and engaging said core, said stud having apertures therethrough that can be aligned with said balancing ducts and means for rotating said stud to vary the position of said apertures relative to said balancing ducts and thereby vary the amount of gas admited into said balancing ducts, blower means driven by said shaft for supplying high pressure cooling gas; and means for conducting gas from the discharge side of said blower into said pressure chambers.

7. A rotor for a gas cooled generator comprising: a shaft having an enlarged core section; said core section having arcuately spaced pole portions and longitudinally extending winding slots formed in the area between said poles; electrical conductors positioned in said winding slots insulated from each other, channel members in said slots for insulating said conductors from said core, said conductors combining with said slot insulating channels to form cooling ducts; longitudinally extending grooves formed in said pole portions of said core near said winding slots; cover means positioned in the top of said grooves to form thermal balancing ducts; longitudinally spaced apertures in said cover means for conducting cooling fluid from said balancing ducts; a pressure chamber formed at at least one end of said core; the ends of said cooling and said balancing ducts opening into said pressure chamber; valves at the end of said balancing ducts adjacent said pressure chambers; said valves comprising a stud extending through said cover, said balancing duct and engaging said core; said stud having apertures therethrough that can be aligned with said balancing ducts; means for rotating said bolt to vary the position of said apertures relative to said balancing ducts; the diameter of said stud being larger than the width of said balancing duct so as to completely close said balancing duct when said apertures are transverse to said balancing duct; blower means driven by said shaft for supplying high pressure cooling gas; and means for conducting gas from the discharge side of said blower into said pressure chambers.

8. A rotor for a gas cooled generator comprising: a shaft having an enlarged core section; said core section having arcuately spaced pole portions and longitudinally extending winding slots formed in the area between said poles; electrical conductors positioned in said winding slots and insulated from each other; channel members positioned in said slots for insulating said conductors from said core, said conductors having concaved beveled edges that combine with the sides of said slot insulating channels to form cooling ducts; longitudinally extending grooves formed in said pole portions of said core near said winding slots; cover means positioned in the top of said grooves to form thermal balancing ducts; longitudinally spaced apertures in said cover means for conducting cooling fluid from said balancing ducts; a retaining ring surrounding the ends of said core section and extending axially outward; annular disks abutting the free ends of said retaining rings and extending radially inward toward said shaft to form a pressure chamber at each end of said core between said shaft; said core; said annular disks and retaining ring; the ends of said cooling and said balancing ducts opening into said pressure chambers; valves at each end of said balancing ducts; said valves comprising a stud extending through said cover, said balancing duct, and engaging said core; said stud having apertures therethrough that can be aligned with said balancing ducts; and means for rotating said bolt to vary the position of said apertures relative to said balancing ducts; the diameter of said stud being larger than the width of said balancing duct so as to completely close said balancing duct when said apertures are transverse to said balancing duct; blower means mounted on said shaft; conduits formed in said shaft communicating from said pressurized chamber beneath said blower to the discharge side of said blower for conducting high pressure gas into said pressure chambers.

References Cited in the file of this patent

FOREIGN PATENTS 648,830    France _____ Aug. 20, 1928